US012755118B2

(12) United States Patent
Raghavan et al.

(10) Patent No.: US 12,755,118 B2
(45) Date of Patent: Oct. 6, 2026

(54) ENCODED PACKAGE ADDRESS FOR DELIVERY

(71) Applicant: Motorola Mobility LLC, Chicago, IL (US)

(72) Inventors: Krishnan Raghavan, Bangalore (IN); Vijayprakash Idlur, Bengaluru (IN); A G Prasad, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 145 days.

(21) Appl. No.: 18/520,989

(22) Filed: Nov. 28, 2023

(65) Prior Publication Data

US 2025/0173532 A1 May 29, 2025

(51) Int. Cl.
*G06Q 10/00* (2026.01)
*G06K 7/14* (2006.01)
*G06Q 10/083* (2023.01)

(52) U.S. Cl.
CPC ......... *G06K 7/1417* (2013.01); *G06Q 10/083* (2013.01)

(58) Field of Classification Search
CPC ...................................................... G06Q 10/02
See application file for complete search history.

(56) References Cited

U.S. PATENT DOCUMENTS

2014/0081951 A1* 3/2014 Greenspan ............ H04L 63/102 707/E17.001
2018/0204177 A1* 7/2018 Ferla .................. G06Q 10/0833
2022/0076517 A1* 3/2022 Haddad ............. G06Q 10/0837

* cited by examiner

*Primary Examiner* — Tonya Joseph
(74) *Attorney, Agent, or Firm* — FIG. 1 Patents

(57) ABSTRACT

In aspects of encoded package address for delivery, a server device generates an interactive encoded address for display on a package for delivery. The interactive encoded address is mapped to an address of an intended recipient of the package. The server device receives a request from a mobile device, or client device, to retrieve the address via the interactive encoded address. The server device selectively transmits at least a portion of the address for display to an authorized user. If the user of the mobile device or the mobile device itself is the authorized user, the mobile device receives the portion of the address and displays the portion of the address to a user via a user interface.

20 Claims, 7 Drawing Sheets

ENCODED PACKAGE ADDRESS FOR DELIVERY

BACKGROUND

Devices, such as smart devices, mobile devices (e.g., cellular phones, tablet devices, smartphones), consumer electronics, and the like, can be implemented for use in a wide range of environments and for a variety of different applications. For example, a device can implement a marketplace application that provides for a user to purchase items. The marketplace application can include a user interface for displaying products to the user. The user may interact with the user interface to purchase products for delivery or pickup, to return products that were previously purchased, to receive personalized product recommendations, to receive notifications related to the marketplace application, and more. Packages ordered by the user may be delivered to a physical location or address, such as to a place of residence of the user.

BRIEF DESCRIPTION OF THE DRAWINGS

Implementations of the techniques for encoded package address for delivery are described with reference to the following Figures. The same numbers may be used throughout to reference like features and components shown in the Figures.

DETAILED DESCRIPTION

Figure 1:
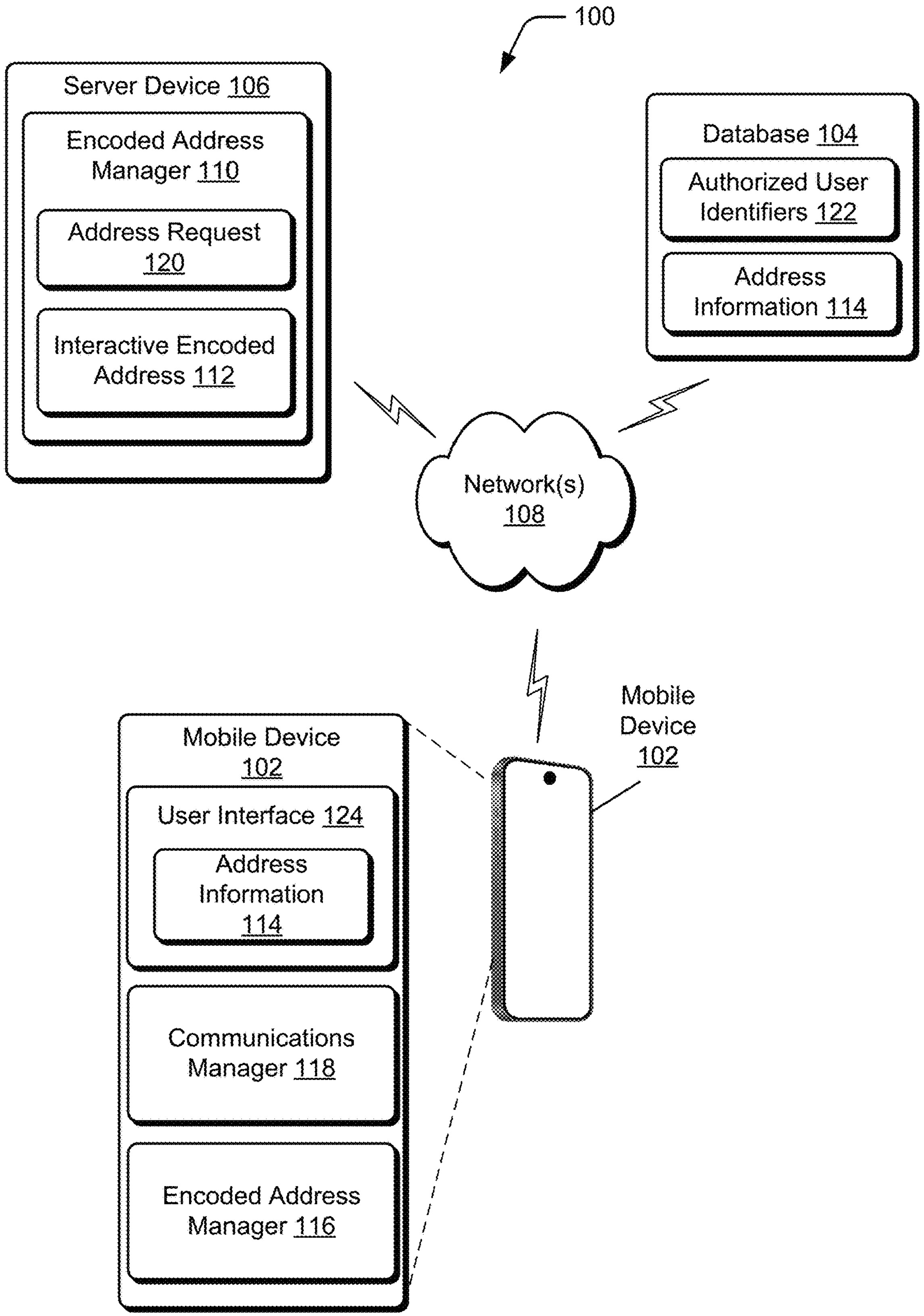
FIGS. 1 and 2 illustrate example systems for an encoded package address for delivery in accordance with one or more implementations as described herein.

Implementations of techniques for an encoded package address for delivery are described herein. In some examples, a customer may order a product or an item from an online marketplace or a physical marketplace. A delivery service may utilize one or more agents to deliver a package including the product to a physical location of an intended recipient of the package. For example, the customer who orders the product can specify a delivery location (e.g., address) as the intended recipient, as well as a delivery date when purchasing the product. In some cases, the address is displayed on the package. If a delivery agent delivers the package to an incorrect address, to an address with multiple residents, or to a location that is accessible by the general public (e.g., a sidewalk, doorstep, etc.), then malicious actors may view the address, causing a security risk for personal data including the address of the intended recipient of the package. Additionally, or alternatively, the malicious actors may view the address during processing of the package prior to delivery of the package, such is in one or more processing facilities, during transportation of the package to the address, or during any other process of delivery of the package. The security risk due to malicious actors obtaining the address include, but are not limited to, personal information exposure, location tracking, social engineering, advertising and data collection, and physical security risks.

As described herein, to reduce, or prevent, security issues related to malicious actors accessing personal data, a delivery service (e.g., a server device of a delivery service) can implement an interactive encoded address that is accessible by authorized users and/or authorized user devices. For example, the server device generates an interactive encoded address for display on a package for delivery to an intended recipient. One or more users (e.g., package handlers, package couriers, package deliverers, an intended recipient of a package delivery) may scan the interactive encoded address (e.g., using a client device or mobile device) to initiate a request for the server device to reveal, or retrieve, the address or a portion of the address. In some examples, users are authorized to access different portions of the address depending on a role or configured user identifier of the users. Additionally, or alternatively, mobile devices are authorized to access different portions of the address. For example, a delivery agent of the delivery service accesses a name of the intended recipient and a full address of the intended recipient, while an intercity transport agent accesses only a zip code. The user (e.g., the delivery agent or the intercity transport agent) may access the address or portion of the address when utilizing a mobile device that is authorized to view the address or portion of the address and may be unable to view the address or portion of the address from a mobile device that is unauthorized to view the address or portion of the address.

The server device can detect that the request came from a user with a user identifier or from a mobile device with an associated user identifier and can compare the user identifier to a list of user identifiers for authorized users and/or authorized mobile devices to verify whether the user and/or mobile device is authorized to access the address information. The list of user identifiers can be configured by the delivery service and/or by the intended recipient of the package. The server device determines whether to transmit the address and which portion of the address to transmit in response to receiving the request. If the user and/or mobile device requesting the address is has an associated user identifier that is on the list of user identifiers, then the server device can send the address, or a portion of the address, to a mobile device for display. If the user and/or the mobile device requesting the address does not have an associated user identifier on the list of user identifiers, then the server device does not send, or refrains from sending, the address to a mobile device for display.

While features and concepts of the described techniques for an encoded package address for delivery can be implemented in any number of different devices, systems, environments, and/or configurations, implementations of the techniques for an encoded package address for delivery are described in the context of the following example systems, process flows, methods, and devices.

FIG. 1 illustrates an example system 100 for an encoded package address for delivery, as described herein. The example system 100 includes a mobile device 102, a database 104, and a server device 106, where the mobile device 102, the database 104, and the server device 106 are interconnectable via one or more networks 108. In some examples, the mobile device 102 includes a smartphone, mobile phone, and/or any other type of wireless device or mobile device. Although one mobile device 102 is illustrated, the server device 106 and the database 104 can be interconnected via the networks 108 with any number of mobile devices and/or other types of devices. The mobile device 102 can be implemented with various components, such as a processor system and memory, as well as any number and combination of different components as further described with reference to the example device shown in FIG. 7. In implementations, the mobile device 102 includes various radios for wireless communication with other devices (e.g., via the networks 108). For example, the mobile device 102 includes a Bluetooth (BT) and/or Bluetooth Low Energy (BLE) transceiver and/or a near field communication (NFC) transceiver. The mobile device 102 can also include a Wi-Fi radio, a global positioning system (GPS) radio, and/or any type of device communication interfaces.

The server device 106 includes various functionality that enables the server device 106 to perform different aspects of an encoded package address for delivery discussed herein, including an encoded address manager 110. The server device 106 is implemented by, or implements, a package delivery service to deliver one or more packages to intended recipients. In some examples, the server device 106 is one or more of a web server, an application server, or a cloud server, among others. The encoded address manager 110 represents functionality (e.g., logic and hardware) for enabling the server device 106 to generate interactive encoded addresses 112 for display on a package for delivery. In some examples, the encoded addresses are interactive because they are scannable, searchable, or can otherwise be interacted with via one or more sensors of a mobile device 102.

A customer may place an order for a product, and the delivery service can deliver the product in a package to an intended recipient (e.g., the customer or another person specified by the customer). When the customer places the order, the customer can also specify an address (e.g., a physical address) of the intended recipient. For example, the user specifies one or more of a name of the intended recipient, a street name and number of a physical location of the intended recipient (e.g., a street address of the intended recipient), a city of residence of the intended recipient, a state or other regional information of residence of the intended recipient, a country of residence of the intended recipient, and/or a zip code of the residence of the intended recipient, among other address information 114. The delivery service can print the address information 114 to a physical label that is affixed on the package for display. However, a physical label including the address information 114, which includes personal data related to the intended recipient of the package, can cause security issues related to access to the address information 114 by a malicious actor.

For example, a malicious actor may access the physical label including the address information 114 and may misuse (e.g., sell, publish, or otherwise misuse) personal details of the recipient of the package, including a name of the recipient of the package, a street address of the recipient of the package, and/or apartment or unit numbers. The malicious actor misusing the personal details can result in identity theft or unauthorized access to the personal life of the recipient. Additionally, or alternatively, a malicious actor may utilize the address to track a location of a recipient of the package, causing safety risks and invasions of privacy, especially for individuals who value their anonymity or have security concerns. Additionally, or alternatively, a malicious actor may utilize address information 114 to engage in social engineering attacks, such as impersonation or phishing attempts, to gain more personal information about the recipient of the package. Additionally, or alternatively, entities (e.g., companies or agents) involved in the delivery process may use addresses for targeted advertising or data collection purposes, causing privacy concerns related to how personal information is shared and used without consent from a recipient of the package. Additionally, or alternatively, displaying address information 114 on packages can attract malicious actors that pose a physical threat to a recipient of the package (e.g., thieves and burglars). The malicious actors may use the address information 114 to identify potential target recipients of a package and to steal valuable items. The malicious actor can be a person and/or a computer system able to read or otherwise obtain the address information 114 that is displayed on a package.

In some cases, address information 114 that is displayed on a package for delivery to a recipient may be viewed and/or accessed by a relatively large numerical quantity of entities (e.g., people and/or computer systems). For example, a label including address information 114 can be placed for display on a package prior to initiation of a delivery process (e.g., by a seller of a product being shipped). The seller may provide the package to a delivery service by physically providing the package to an initial agent of the delivery service. The initial agent can send the package to one or more secondary agents involved in the delivery procedure, such as a warehouse packing agent, an intercity transport agent, an intracity transport agent, and/or a delivery agent. Each agent may have access to the address information 114 of the user. One or more of the agents may be malicious actors, resulting in security issues due to the address information 114 being displayed to the agents.

Additionally, or alternatively, the package may be left during the delivery process in an insecure area that is accessible by one or more entities (e.g., people or computer systems) that are not authorized to access the address information 114. During transport the package may be moved to different locations, where some or all of the locations are not monitored, providing for potential security issues. For example, if the package is moved by multiple modes of transportation (e.g., train, motorized vehicle, plane, etc.), the packages may be exposed during loading and unloading of the packages between respective modes of transportation. During delivery of the package, a delivery agent may leave the package in an unsecure location (e.g., a location accessible by the public or other residents of the physical address), providing for opportunities for a malicious actor to view the address information 114 of the intended recipient. Further, once the intended recipient has received the package, the intended recipient may discard the packaging material that includes the address information 114. Malicious actors may access the discarded packaging, and therefore the address information 114, resulting in security issues.

In some examples, to reduce, or prevent, the security issues, the server device 106 receives the address information 114 for a delivery of a package to an intended recipient and generates an interactive encoded address 112. The interactive encoded address 112 is displayed on the package (e.g., printed out and affixed on the package in the form of a label, or printed directly on the package). The encoded address is interactive because a mobile device, or other device, can scan the encoded address to send a request to retrieve address information 114 of an intended recipient of the package. In some cases, the encoded address manager 110 can generate a quick response (QR) code that represents the address information 114, which is a code made up of a series of dots arranged in a square grid that store data. The dots and/or absence of a dot represents a binary value (e.g., 1 or 0). The unique pattern in the QR code represent a set of letters that a computing device can use to access a web page, or other information, such as the address information 114. In some other cases, the encoded address manager 110 can generate a barcode, or any other encoded information, that represents the address information 114.

The mobile devices 102 include various functionality that enables the mobile device 102 to perform different aspects of an encoded package address for delivery discussed herein, including an encoded address manager 116 and a communications manager 118. The encoded address manager 116 represents functionality (e.g., logic and hardware) for enabling the mobile device 102 to scan an interactive encoded address 112 displayed on a package for delivery. For example, the encoded address manager 116 sends instructions to a sensor (e.g., a camera imaging device of the mobile device 102) to scan the interactive encoded address 112. By scanning the interactive encoded address 112 displayed on the package, the encoded address manager 116 can send a trigger to the communications manager 118 to transmit a request to the server device 106 to reveal, or retrieve, an address of an intended recipient of the package. The communications manager 118 can send the request to the server device 106 using the networks 108.

The communications manager 118 represents functionality (e.g., logic and hardware) for enabling the mobile device 102 to interconnect with other devices and/or networks, such as the networks 108. The communications manager 118, for instance, enables wireless and/or wired connectivity of the mobile device 102. For example, the communications manager 118 represents one or more antennas for transmitting and receiving signaling from other devices via the networks 108.

The networks 108 can include computer networks and/or telecommunication networks. For example, the networks 108 include a wireless local area network (WLAN), a wireless network, a BT network, a cellular network, a satellite network, and/or a fiber optic network. The networks 108 connect one or more devices, such as the server device 106, the database 104, and one or more mobile devices 102, among others.

The server device 106 can receive an address request 120 from a mobile device 102 via the networks 108. The encoded address manager 110 can determine a user identifier of a user of the mobile device 102 or a user identifier of the mobile device 102 itself to determine whether the address request 120 is sent from an authorized user. The user identifiers of the users and/or of the mobile devices 102 can be assigned to the user or the mobile device 102 upon initialization of a user account utilized to access the address information 114 and/or during setup of the mobile device 102. The encoded address manager 110 can compare the user identifier to a list of user identifiers of users and/or mobile devices 102 that are authorized to access the address information 114 (e.g., a list of authorized user identifiers 122). If the user identifier is on the list of authorized user identifiers 122, then the server device 106 verifies that the user and/or the mobile device 102 is authorized to access the address information 114. The server device 106 sends the address information 114, or a portion of the address information 114, to the mobile device 102 via the networks 108. If the user identifier is not on the list of authorized user identifiers 122, then the user and/or the mobile device 102 is not authorized to access the address information 114. The server device 106 can generate a message indicating that the user and/or the mobile device 102 is not authorized to access the address information 114 and can send the message to the mobile device 102 (e.g., for display to a user of the mobile device 102) via the networks 108.

In some examples, if the interactive encoded address 112 is a QR code representing the address and the user and/or the mobile device 102 is authorized to access the address information 114, then the server device 106 sends a Uniform Resource Locator (URL), or other address that provides a path to a file including the address information 114 on the server, 106 to the mobile device 102. If the interactive encoded address 112 is a barcode representing the address and the user and/or the mobile device 102 is authorized to access the address information 114, then the server device 106 sends the address information 114 to the mobile device 102. In some examples, the server device 106 stores the address information 114 at a database 104 (e.g., a secure database). The server device 106 accesses the database 104 to obtain the URL and/or address information 114.

The database 104 stores data for one or more devices. For example, the database 104 stores authorized user identifiers 122 on a list configured by the server device 106 and/or a user. Additionally, or alternatively, the database 104 stores address information 114 for recipients of packages. The database 104 is an example of a remote database (e.g., cloud or network-based database), a physical database, or the like. In some examples, the database 104 can be hosted at a server device 106, which is an example of a local database. The mobile device 102 can store the authorized user identifiers 122 and/or the address information 114 at the local database. In some other examples, the mobile device 102 connects to a remote database, or cloud database, to store the authorized user identifiers 122 and/or the address information 114, among other data. Additionally, or alternatively, the server device 106 can host the database 104, can connect to a remote database (e.g., via the networks 108), or both, to access the authorized user identifiers 122 and/or the address information 114.

In some examples, the authorized user identifiers 122 represent users and/or mobile devices 102 on an authorized, or trusted, list of users and/or mobile devices 102. An intended recipient of the package may specify a list of users and/or mobile devices 102 authorized to access a portion or all of the address information 114 for the intended recipient. For example, the intended recipient may specify the list via a GUI, or other user interface 124, of a mobile device 102. Additionally, or alternatively, the mobile device 102, the server device 106, or both can autonomously determine the authorized user identifiers 122 (e.g., independent of user input), such as by analyzing the role of each user or mobile device 102 and/or how much of the address the user or mobile device 102 has access to. For example, if the mobile device 102 is a personal mobile device 102 of an agent in the delivery process, then the mobile device 102 may not be authorized to access the address information 114. However, if the mobile device 102 is a device utilized for accessing address information 114 by the agent in the delivery process, then the mobile device 102 may be authorized to access the address information 114. In some examples, different agents in the delivery process can have different levels of access to the address information 114, as shown in Table 1.

TABLE 1

| Example Agent Title | Level of Access |
|---|---|
| Warehouse Packing Agent | Name, Pin code |
| Intercity Transport Agent | Zip code |

TABLE 1-continued

| Example Agent Title | Level of Access |
|---|---|
| Intracity Transport Agent | Zip code |
| Delivery Agent | Name and Full Address |

For example, a warehouse packing agent has access to a name of the intended recipient of a package and a pin code identifying information (e.g., a next processing location) for the package, an intercity transport agent has access to a zip code, an intracity transport agent also has access to a zip code of the intended recipient, and an on the ground delivery agent has access to a name of the intended recipient and a full address of the intended recipient. Each agent may scan the interactive encoded address 112 displayed on the package to determine the address information 114 available to that agent. The server device 106 retrieves the address information 114 by comparing a user identifier of the user of a mobile device 102 (e.g., based on login credentials of the user input to the mobile device) and/or a user identifier of the mobile device 102 to a list of authorized user identifiers 122 to determine whether a user of a mobile device 102 and/or whether the mobile device 102 that sends a request to retrieve address information 114 is authorized to view the address information 114 and/or what level of access the user and/or mobile device 102 has to the address information 114. The level of access the user and/or the mobile device 102 has to the address information 114, as well as the list of authorized user identifiers 122, can be stored at the database 104.

Figure 2:
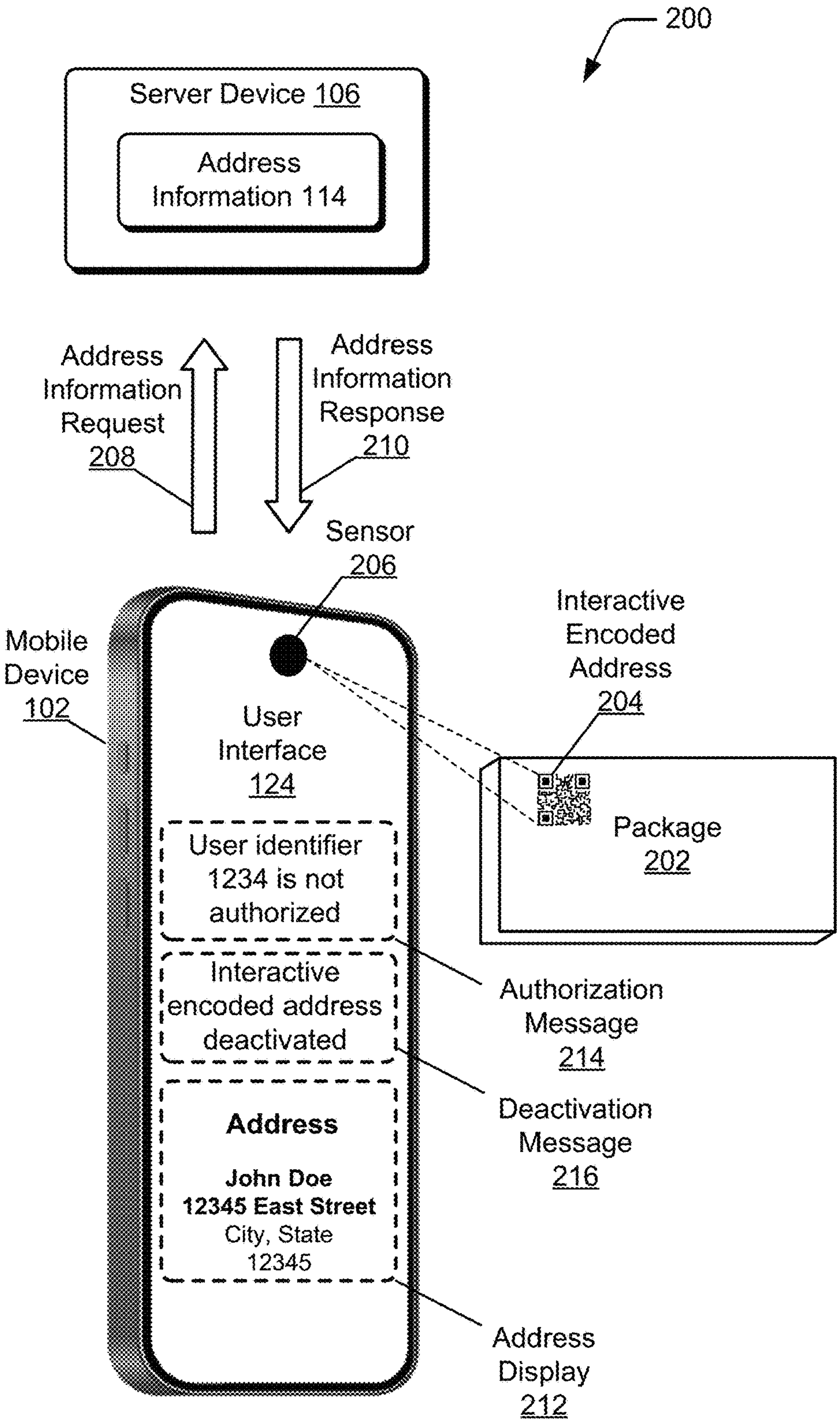

In some cases, once a mobile device 102 receives address information 114 from a server device 106, then the mobile device 102 displays the address information 114 to a user of the mobile device 102 via a user interface 124 of a device application on the mobile device 102, which is described in further detail with respect to FIG. 2. In some examples, once a final user accesses the interactive encoded address 112 (e.g., an intended recipient of the package and/or a delivery agent), the server device 106 deactivates the interactive encoded address 112. The server device 106 can specify a final user and can compare user identifiers for users and/or mobile devices 102 that initiate each request for the address information 114 to determine whether that user is a final user. In some other cases, a final user can specify that a delivery procedure or process is complete and can trigger deactivation of the interactive encoded address 112 by sending a message to the server device 106 via the mobile device 102. For example, if a final user is a delivery agent responsible for delivering the package to the location of the intended recipient or a mobile device 102 of the same delivery agent, then the delivery agent can send a message to the server device 106 using the mobile device 102 to trigger deactivation of the interactive encoded address 112. In some other examples, if the final user is an intended recipient of the package and/or a mobile device of the intended recipient, then the intended recipient can scan the interactive encoded address 112 using the mobile device 102 to ensure that the package is correctly delivered to the intended recipient and to trigger deactivation (e.g., by the server device 106) of the interactive encoded address 112.

FIG. 2 illustrates an example system 200 for encoded package address for delivery in accordance with one or more implementations as described herein. The example system 200 may implement aspects of the example system 100 described with reference to FIG. 1. The example system 200 may include a mobile device 102 with a user interface 124 of a device application (e.g., a package tracking application, an Internet browser application, and the like) and a server device 106 that accesses address information 114, which are examples of the corresponding features as described with reference to FIG. 1. Although the database 104 and the one or more networks 108 are not illustrated in the example system 200, the server device 106 and/or the mobile device 102 can implement one or more databases 104 and can be connected via one or more networks 108, as described with reference to FIG. 1.

In some examples, a customer purchases a product by interacting with an online marketplace application and/or purchases a product from a physical marketplace. During the purchase process for purchasing the product, the online marketplace application prompts the customer to input delivery information for the product. The online marketplace application coordinates with a delivery service to deliver a package 202 that includes the product. In some examples, the delivery service includes one or more agents that are responsible for delivering the package 202. In some cases, the agents include personnel hired to move a package 202 from a source location to a destination location (e.g., a location specified by a user that purchased the product), devices or machines configured to move the package 202 from the source location to a destination location (e.g., drone delivery, autonomous vehicle delivery, or delivery by another device or machine), or both. It is to be appreciated that an agent can be a human agent or a non-human agent.

In some examples, the delivery service generates a physical label including address information 114 and places (e.g., affixes) the label for display on the package 202. An agent accesses, or reads, the address information 114 to determine the final destination of the package 202, where the address information 114 is specified by a customer (e.g., via the online marketplace application). The address information 114 includes a name of an intended recipient, a street name and number of the intended recipient, a city of residence of the intended recipient, a state or other region of residence of the intended recipient, and/or a zip code of the intended recipient. For example, address information 114 for an intended recipient can include a name "John Doe," a street address "12345 East Street," a city "City," a state "State," and a zip code "12345." However, displaying address information 114, which includes personal data of an intended recipient, on a package 202 causes security issues, as described with reference to FIG. 1.

In some examples, to reduce or eliminate the security issues (e.g., identify theft and/or data breaches, among other security issues), a server device 106 can generate an interactive encoded address 204. In variations, the interactive encoded address 204 is a QR code, a barcode, or any other type of code that a user of a mobile device 102 can interact with to send a request to display an address of an intended recipient of a package 202. In some cases, the server device 106 can request a selection of authorized user identifiers from a user via a mobile device 102 of the user (e.g., a customer that purchased the product in the package 202, the intended recipient of the package 202, an agent of the delivery service etc.), and the user can select one or more authorized user identifiers via a user interface 124. The selection can include user identifiers of the agents, a user identifier of the intended recipient, or user identifiers of mobile devices 102 of the agents and/or intended recipient. In some other cases, the authorized user identifiers are preconfigured by the delivery service or are otherwise defined. The user and/or the delivery service may also specify a level of access that each authorized user identifier has. In some examples, the authorized user identifiers have a same level of access. In some other examples, the authorized user identifiers have a specified level of access, such that each authorized user identifier can have a different level of access. For example, the level of access can be specified according to Table 1, as described with reference to FIG. 1.

The user and/or the delivery service may also specify a final user or a final mobile device 102, which is a user or mobile device 102 that marks a termination of a delivery procedure or process. The final user can be an intended recipient of the package 202 and/or a last agent in the delivery process. Similarly, the final mobile device 102 can be a mobile device 102 of an intended recipient of the package 202 and/or a last agent in the delivery process. In some examples, when the final user interacts with the interactive encoded address 204 (e.g., scans the interactive encoded address 204), then the server device 106 can deactivate the interactive encoded address 204. Deactivation includes canceling or otherwise eliminating a pathway between the interactive encoded address 204 and the address of the intended recipient. For example, if an additional mobile device 102 scans the interactive encoded address 204 after the final user has scanned the interactive encoded address 204, then the server device 106 does not return the address to the additional mobile device 102. Thus, the interactive encoded address 204 is deactivated upon delivery of the package 202.

In some examples, the server device 106 generates an interactive encoded address 204 that includes a portion of the address that is accessible by viewing the interactive encoded address 204. For example, for ease of use for agents in the delivery process, a portion of the address information 114 can be embedded or printed in a central location on the interactive encoded address 204. The portion of the address information 114 can include a zip code, such that the delivery service agents can access the zip code without scanning the interactive encoded address 204. In some other examples, the address information 114 is not displayed for view on the interactive encoded address 204, and a user of a mobile device 102 scans the interactive encoded address 204 using a sensor 206 of the mobile device 102 to access address information 114.

A mobile device 102 is configured to run one or more applications, such as a delivery service application, a camera application, or the like. The mobile device 102 has a user interface 124 that displays an application to a user, and the user interacts with the application via the user interface 124. The user can utilize an application (e.g., a camera application) to control sensors 206 of the mobile device 102 to scan the interactive encoded address 204. For example, the application can communicate with a sensor 206 of the mobile device 102 to access data, such as the address information 114, stored at the server device 106 via the interactive encoded address 204. If the sensor 206 is a camera, then a user of the mobile device 102 can scan the interactive encoded address 204 by hovering the camera over the interactive encoded address 204 and/or taking a picture of the interactive encoded address 204. In some other examples, the sensor 206 can be a barcode scanner or any other type of sensor that accesses the interactive encoded address 204. When the user scans or otherwise accesses the interactive encoded address 204, the mobile device 102 sends an address information request 208 to the server device 106. The sensor 206 can be located at the mobile device 102 (e.g., a component integrated into the mobile device 102) and/or independent of the mobile device 102 (e.g., wired or wirelessly communicating with the mobile device 102). In some examples, the application stores application data, such as one or more user credentials of users utilizing the application and/or an identifier of mobile devices 102 that have installed the application. The credentials can include a user identifier of the user.

In some examples, the address information request 208 triggers the server device 106 to access a database (e.g., the database 104 as described with reference to FIG. 1) to obtain the address information 114. The address information request 208 can include a user identifier of a user of the mobile device 102 and/or a user identifier of the mobile device 102 itself. The server device 106 can access the database to compare the user identifier to a list of user identifiers of authorized users and/or mobile devices 102 (e.g., users and mobile devices 102 that are approved to view at least a portion of the address). In some examples, the server device 106 can send an address information response 210 to the mobile device 102. In some cases, if the user identifier of the user or mobile device 102 accessing the address information 114 is on the list of user identifiers, then the address information response 210 includes the portion of the address information 114 that the authorized user or mobile device 102 is approved to access. In some other cases, if the user identifier of the user or mobile device 102 accessing the address information 114 is not on the list of user identifiers, then the address information response 210 includes an indication that the user or mobile device 102 is not authorized to view the address information 114. In some examples, if the address information request 208 is received after the interactive encoded address 204 is deactivated, then the address information response 210 includes an indication that the interactive encoded address 204 is deactivated.

If the user or the mobile device 102 has a corresponding user identifier that is on the list of authorized user identifiers, then the mobile device 102 presents an address display 212 to the user of the mobile device 102 via the user interface 124. The address display 212 includes the address information 114 that is returned by the address information response 210. For example, if the user or the mobile device 102 requesting to access the address information 114 is authorized to view the name of the intended recipient and a street address of the intended recipient, then the address display 212 can present "John Doe 12345 East Street City, State 12345." If the user or the mobile device 102 requesting to access the address information 114 is not authorized to view the address information 114, then the mobile device 102 presents an authorization message 214 that indicates "User identifier 1234 is not authorized," for a user or mobile device 102 with a user identifier of 1234. If a user or a mobile device 102 is attempting to access the address information 114 after the interactive encoded address 204 is deactivated, then the mobile device 102 presents a deactivation message 216 that indicates "interactive encoded address deactivated."

Figure 3:
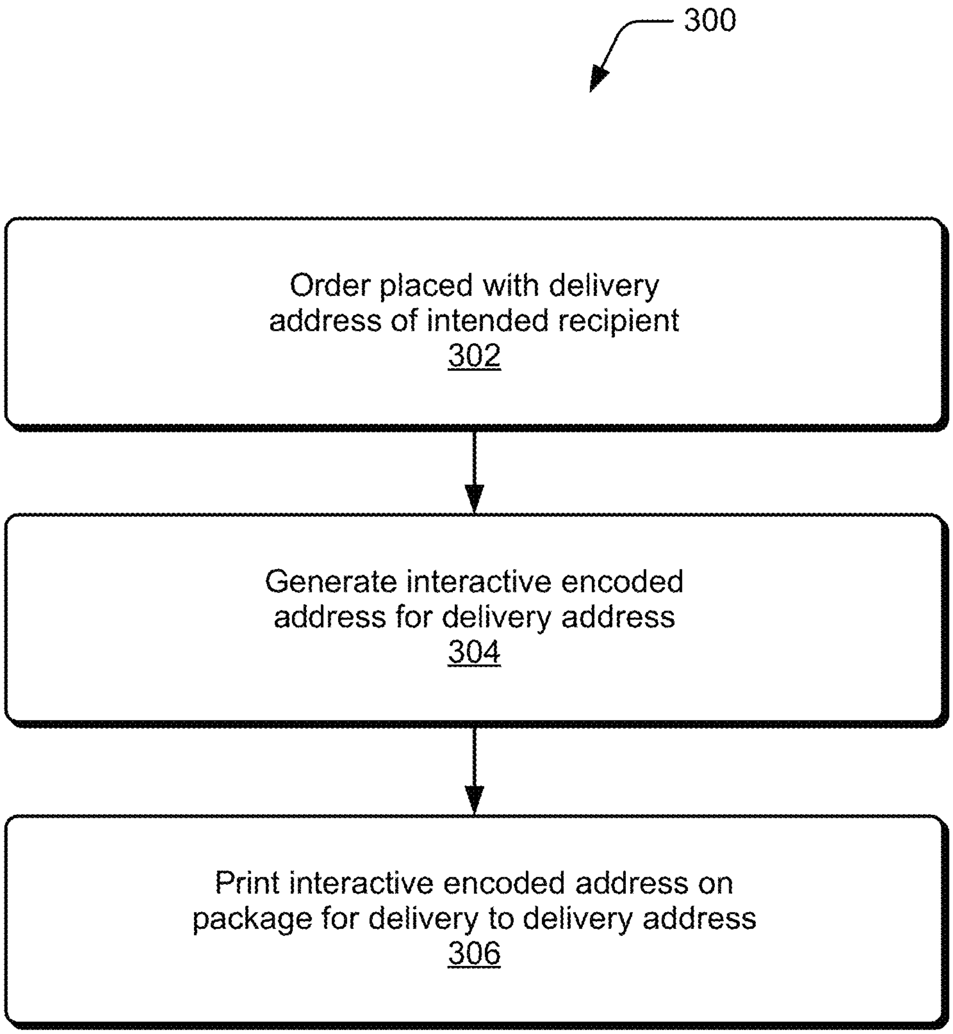
FIGS. 3 and 4 illustrate example process flows, which support an encoded package address for delivery in accordance with one or more implementations as described herein.

FIG. 3 illustrates an example process flow 300, which supports encoded package address for delivery in accordance with one or more implementations as described herein. The example process flow 300 may implement aspects of the example system 100, as well as the example system 200. For example, the example process flow 300 can be implemented by a server of a delivery service (e.g., a server device), which may be examples of the server device 106 described with reference to FIGS. 1 and 2. Alternative examples of the following may be implemented, where some processes are performed in a different order than described or are not performed. In some cases, processes may include additional features not mentioned below, or further processes may be added.

At 302, a server device can determine an order is placed for an item that is to be delivered to an intended recipient by a delivery service. A customer may place the order via an online marketplace application or at a physical marketplace. The package can be moved by the delivery service from an initial location to a destination location, or delivery location, indicated by the customer that purchased the item. For example, the package is physically transported by agents of the delivery service from the initial location to the destination location. The customer can specify the delivery location as a physical address of an intended recipient of the package.

At 304, the server device can generate an interactive encoded address including the delivery address information. The interactive encoded address can be an example of the interactive encoded address 204 as described with reference to FIG. 2. In some examples, the server can convert the delivery address to a QR code mapping a URL that exposes selective or no portions of the address to agents of the delivery service based on a role of the agent and invalidates the mapping once the delivery has occurred (e.g., a final user scans the interactive encoded address) to improve data privacy and security for the personal data included in the delivery address.

At 306, an agent of the delivery service may place the interactive encoded address on the package. For example, variations of addressing the package can include using a machine that can print and affix a label including the interactive encoded address on the package, personnel can print and affix the label on the package, the interactive encoded address can be manufactured directly on the package, or the like.

Figure 4:
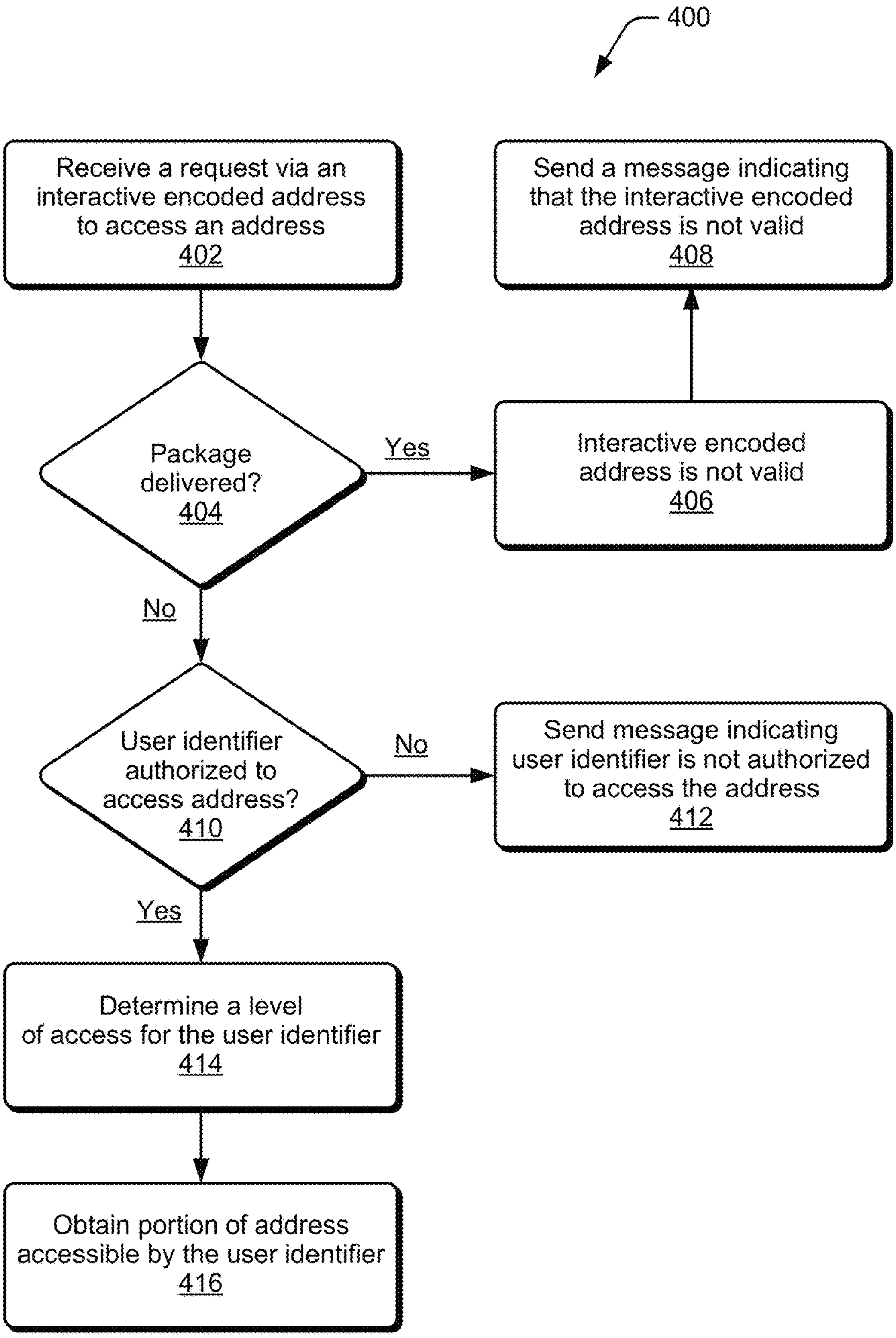

FIG. 4 illustrates an example process flow 400, which supports encoded package address for delivery in accordance with one or more implementations as described herein. The example process flow 400 may implement aspects of the example system 100, as well as any of the example system 200 or the process flow 300. For example, the example process flow 400 can be implemented by a mobile device of a user and/or a server device, which may be examples of the corresponding features as described with reference to FIGS. 1 and 2. Alternative examples of the following may be implemented, where some processes are performed in a different order than described or are not performed. In some cases, processes may include additional features not mentioned below, or further processes may be added.

At 402, a server device can receive a request to access address information from a mobile device via an interactive encoded address (e.g., an interactive address mapping), where the interactive encoded address is an example of an interactive encoded address 204 as described with reference to FIG. 2. The request can include a user identifier of a user of a mobile device that sent the request and/or of the mobile device itself. For example, a user may provide user credentials (e.g., a username and password) to an account on the mobile device, and the account can have an associated user identifier. Similarly, the mobile device can be assigned a user identifier when initializing an application for accessing address information for delivery of a package and/or upon setup of the mobile device. Once the user scans the interactive encoded address, the mobile device sends the request to the server including the user identifier of the account and/or the user identifier of the mobile device.

At 404, the server device can determine whether the package has already been delivered. For example, the server device can determine whether a final user and/or a final mobile device has already scanned the interactive encoded address, can determine the package is delivered based on an input to a delivery service system from a delivery agent that delivered the package, or the like.

At 406, if the package is already delivered, the server device can determine that the interactive encoded address is no longer valid. For example, the server device can deactivate the interactive encoded address when the package is delivered, so the interactive encoded address is no longer valid after the deactivation. In some examples, at 408, the server device can send a message to a mobile device for display to a user that sent the request for the address information. The message can indicate that the interactive encoded address is no longer valid (e.g., has been deactivated).

At 410, if the package is not already delivered, the server device can determine whether a user and/or a mobile device that sent the request for the address information is authorized to access the address information. For example, the server device accesses a database to obtain a list of user identifiers of authorized users and/or authorized mobile devices. The list can be configured by a user that purchased the item in the package, by an intended recipient of the package, and/or preconfigured by the delivery service. Each user identifier on the list can have a corresponding level of access to the address information.

At 412, if the user identifier is not on the list of authorized user identifiers (e.g., for an unauthorized requestor), then the server device can send a message to a mobile device of the user attempting to access the address information. The mobile device of the user can display the message to the user. The message can indicate that the user and/or the mobile device is not authorized to access the address.

At 414, if the user identifier is on the list of authorized user identifiers, then the user and/or the mobile device is authorized to access the address. The server device can determine a level of access to the address information for the user and/or mobile device attempting to access the address information by using a user identifier for the user and/or the mobile device. For example, the level of access for the user and/or the mobile device is stored in a database with the user identifier and the server device accesses the database to obtain the level of access for the user and/or the mobile device.

At 416, the server device can obtain a portion of the address information that is accessible by the user and/or the mobile device (e.g., according to the level of access to the address information of the user or the mobile device). The server device can access a database to obtain the portion of the address information. The portion of the address information can include a zip code, a street address, a name, and/or any other portion of the address information. For example, a first user may have access to a zip code, but not a street address or name of the intended recipient, while a second user may have access to the zip code, street address, and name of the intended recipient. The server device can receive multiple requests for the address information (e.g., from different agents as part of the delivery process) and can return different portions of the address information for each request.

In some examples, if the user is a final user and/or a final mobile device (e.g., a delivery agent, an intended recipient, or any other configured final user, or a mobile device of the like), then the server device can deactivate the interactive encoded address. Deactivation can include canceling or otherwise eliminating a path between the interactive encoded address and the address information. If the server device receives an additional request to reveal, or retrieve, the address information after the address is deactivated, then the server device sends the message at 408 indicating that the interactive encoded address is not valid.

Figure 5:
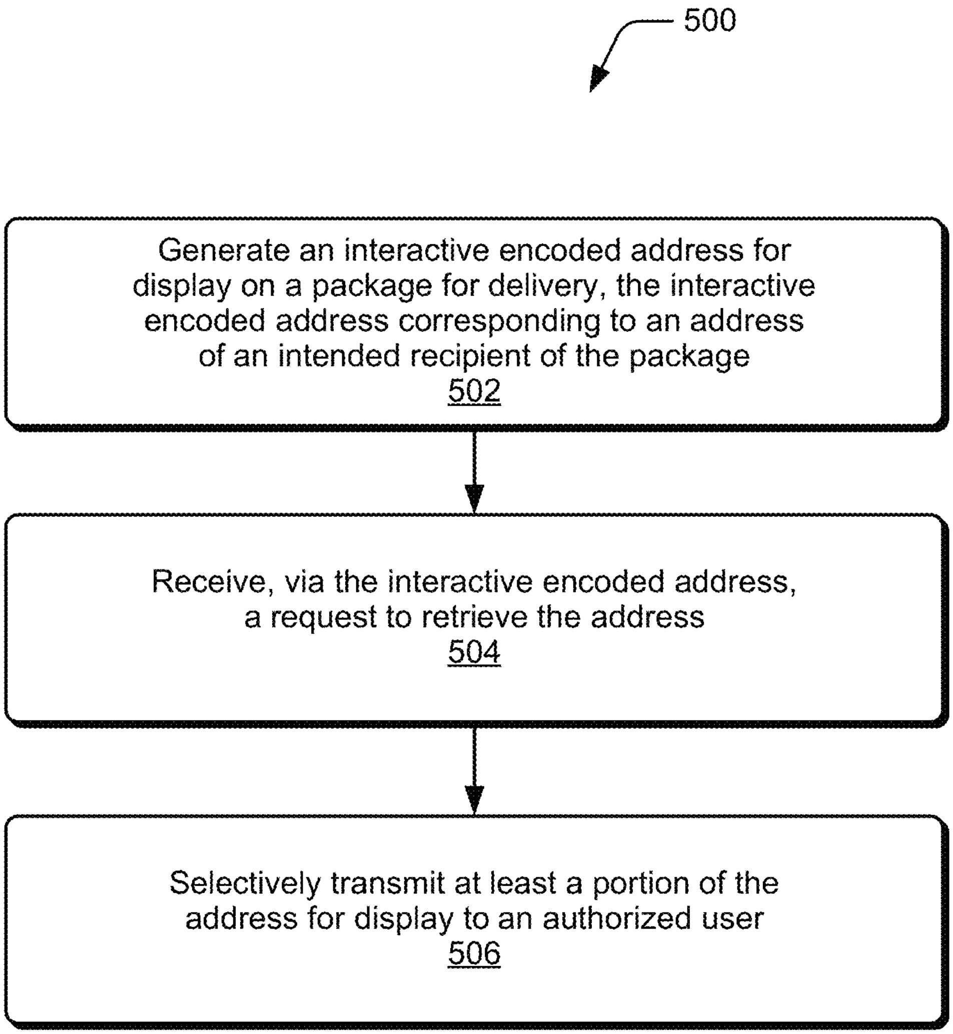
FIGS. 5 and 6 illustrate example methods for an encoded package address for delivery in accordance with one or more implementations of the techniques described herein.

FIG. 5 illustrates one or more example methods 500 for encoded package address for delivery. The order in which the method is described is not intended to be construed as a limitation, and any number or combination of the described method operations can be performed in any order to perform a method, or an alternate method.

At 502, an interactive encoded address is generated for display on a package for delivery. The interactive encoded address corresponds to an address of an intended recipient of the package. For example, the encoded address manager 110 can generate the interactive encoded address (e.g., a QR code and/or a barcode). At 504, a request to retrieve the address is received via the interactive encoded address.

At 506, at least a portion of the address is selectively transmitted for display to an authorized user. In some cases, the encoded address manager 110 transmits at least the portion of the address upon verifying a list of user identifiers for authorized users and/or authorized mobile devices includes a user identifier of the authorized user, where the request is received from the authorized user. The encoded address manager 110 retrieves the address of the intended recipient of the package from a database. If the user identifier is a user identifier of a final user, the encoded address manager 110 deactivates the interactive encoded address. If the encoded address manager 110 receives an additional request to retrieve the address after deactivating the interactive encoded address, then the encoded address manager 110 transmits an indication that the interactive encoded address is deactivated in response to the additional request. The encoded address manager 110 determines a level of access to the address for a user with the user identifier, where at least the portion of the address is based on the level of access to the address. The encoded address manager 110 receives an additional request to retrieve the address via the interactive encoded address and transmits at least an additional portion of the address in response to the additional request for display to an additional authorized user based on the list of user identifiers including a user identifier of the additional authorized user.

In some other cases, the encoded address manager 110 refrains from transmitting (e.g., does not transmit) at least the portion of the address based on a list of user identifiers of authorized users failing to include a user identifier of a user that sent the request. A message indicating that the list of user identifiers fails to include the user identifier associated with the request is transmitted in response to the request. The encoded address manager 110 receives an additional request to access the address from the authorized user and transmits at least the portion of the address for display to the authorized user in response to the additional request based on the list of user identifiers including a user identifier of the authorized user. In some examples, an indication of a level of access to the address is received for the authorized user, where at least the portion of the address is determined based on the level of access to the address.

Figure 6:
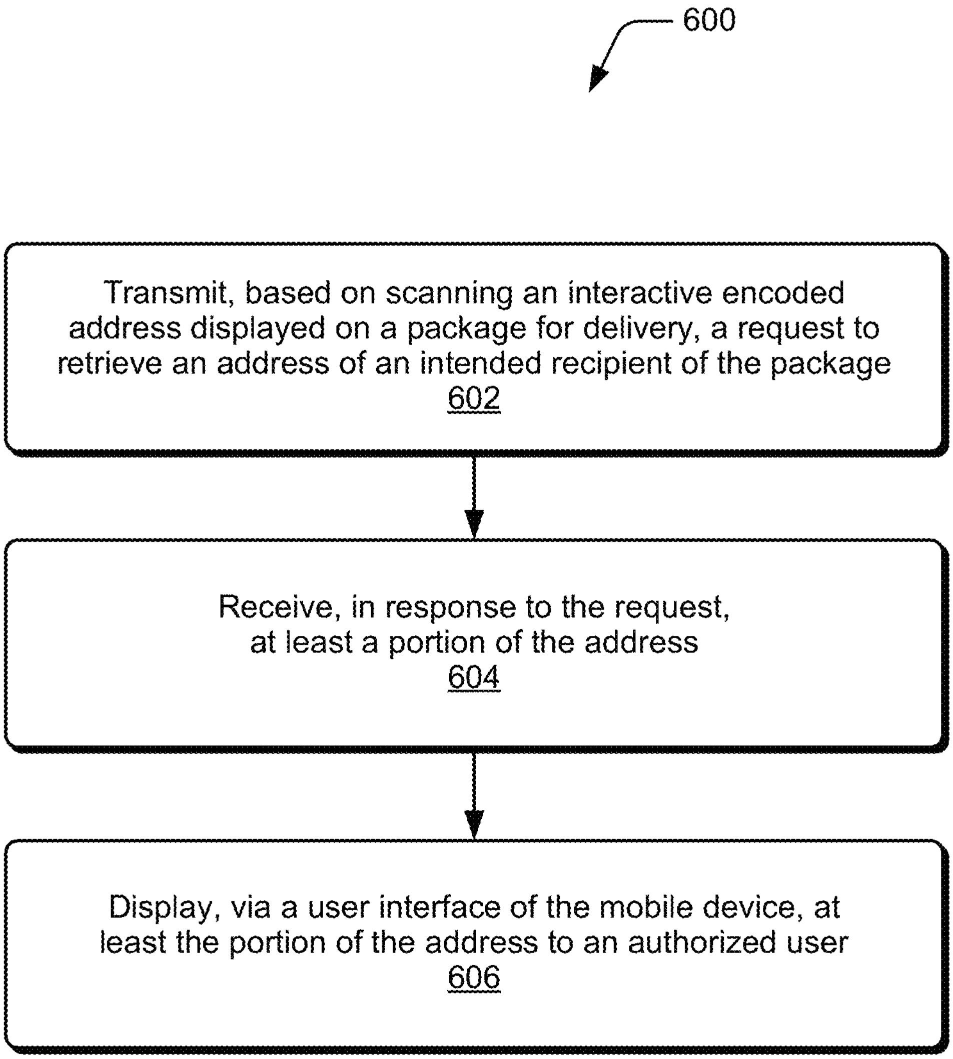

FIG. 6 illustrates one or more example methods 600 for encoded package address for delivery. The order in which the method is described is not intended to be construed as a limitation, and any number or combination of the described method operations can be performed in any order to perform a method, or an alternate method.

At 602, a request is transmitted to retrieve an address of an intended recipient of the package based on scanning an interactive encoded address displayed on a package for delivery. For example, a communications manager 118 transmits the request. The interactive encoded address includes at least one of a QR code or a barcode. At 604, at least a portion of the address is received in response to the request. For example, the communications manager 118 receives the portion of the address. In some examples, at least the portion of the address is received based on a list of user identifiers for authorized users including a user identifier of the authorized user, where the request is transmitted from the authorized user. At 606, at least the portion of the address is displayed to an authorized user via a user interface of a mobile device, or client device.

Figure 7:
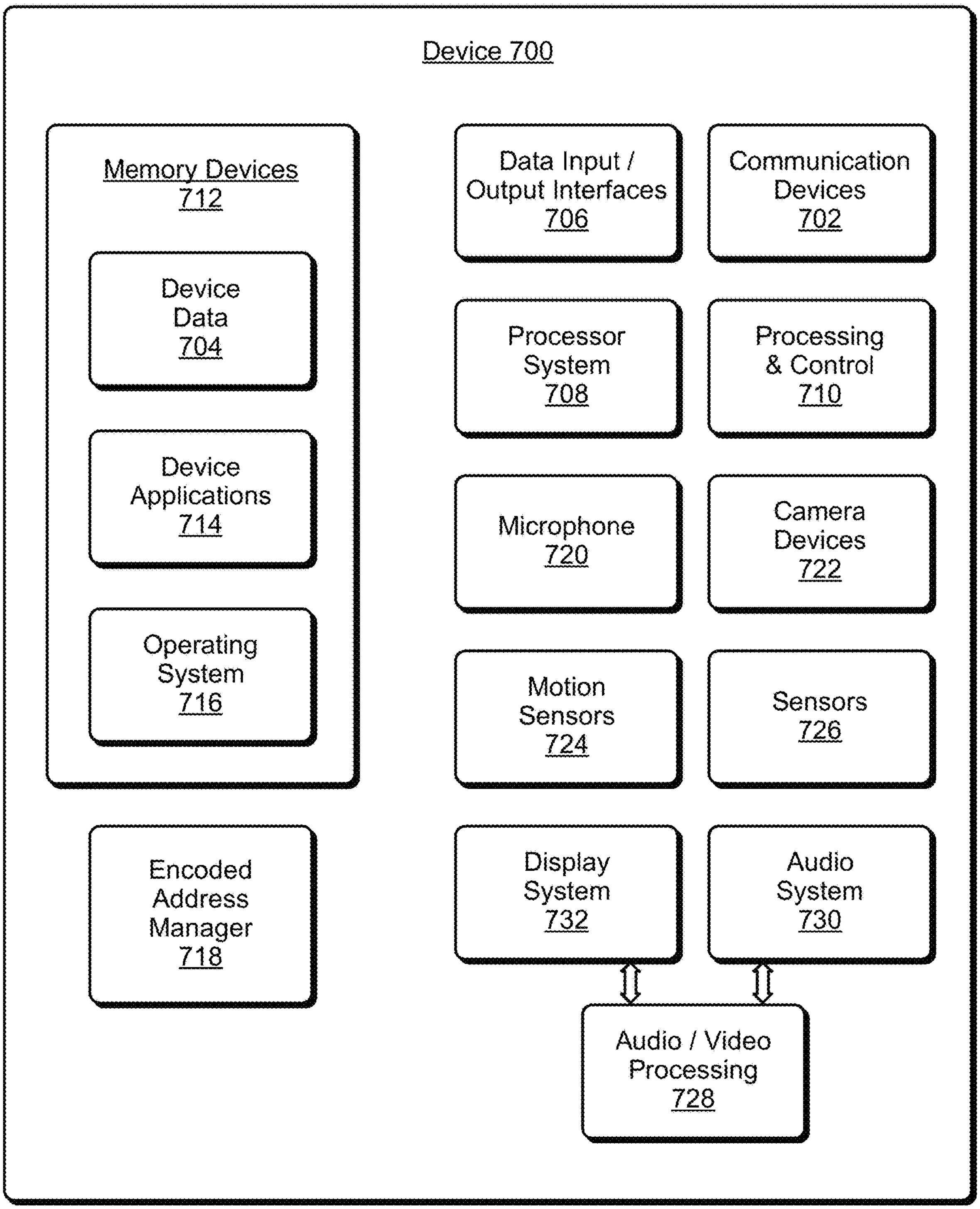
FIG. 7 illustrates various components of an example device that can be used to implement the techniques for an encoded package address for delivery as described herein.

FIG. 7 illustrates various components of an example device 700, which can implement aspects of the techniques and features for encoded package address for delivery, as described herein. The example device 700 can be implemented as any of the devices described with reference to the previous FIGS. 1 through 6, such as any type of a server device 106 (e.g., a server device), a wireless device, a mobile device, a mobile phone, a flip phone, a mobile device 102, companion device, paired device, display device, tablet, computing, communication, entertainment, gaming, media playback, and/or any other type of computing, consumer, and/or electronic device. For example, the mobile device 102 and/or the server device 106 described with reference to FIGS. 1 through 6 may be implemented as the example device 700.

The example device 700 can include various, different communication devices 702 that enable wired and/or wireless communication of device data 704 with other devices. The device data 704 can include any of the various device's data and content that is generated, processed, determined, received, stored, and/or communicated from one computing device to another. Generally, the device data 704 can include any form of audio, video, image, graphics, and/or electronic data that is generated by applications executing on a device. The communication devices 702 can also include transceivers for cellular phone communication and/or for any type of network data communication.

The example device 700 can also include various, different types of data input/output (I/O) interfaces 706, such as data network interfaces that provide connection and/or communication links between the devices, data networks, and other devices. The I/O interfaces 706 can be used to couple the device to any type of components, peripherals, and/or accessory devices, such as a computer input device that may be integrated with the example device 700. The I/O interfaces 706 may also include data input ports via which any type of data, information, media content, communications, messages, and/or inputs can be received, such as user inputs to the device, as well as any type of audio, video, image, graphics, and/or electronic data received from any content and/or data source.

The example device 700 includes a processor system 708 of one or more processors (e.g., any of microprocessors, controllers, and the like) and/or a processor and memory system implemented as a system-on-chip (SoC) that processes computer-executable instructions. The processor system 708 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that may be implemented in connection with processing and control circuits, which are generally identified at 710. The example device 700 may also include any type of a system bus or other data and command transfer system that couples the various components within the device. A system bus can include any one or combination of different bus structures and architectures, as well as control and data lines.

The example device 700 also includes memory and/or memory devices 712 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 712 include volatile memory and non-volatile memory, fixed and removable media devices, and any suitable memory device or electronic data storage that maintains data for computing device access. The memory devices 712 can include various implementations of random-access memory (RAM), read-only memory (ROM), flash memory, and other types of storage media in various memory device configurations. The example device 700 may also include a mass storage media device.

The memory devices 712 (e.g., as computer-readable storage memory) provide data storage mechanisms, such as to store the device data 704, other types of information and/or electronic data, and various device applications 714 (e.g., software applications and/or modules). For example, an operating system 716 can be maintained as software instructions with a memory device 712 and executed by the processor system 708 as a software application. The device applications 714 may also include a device manager, such as any form of a control application, software application, signal-processing and control module, code that is specific to a particular device, a hardware abstraction layer for a particular device, and so on.

In this example, the device 700 includes an encoded address manager 718 that implements various aspects of the described features and techniques described herein. The encoded address manager 718 can be implemented with hardware components and/or in software as one of the device applications 714, such as when the example device 700 is implemented as the mobile device 102 and/or the server device 106 described with reference to FIGS. 1 through 6. An example of the encoded address manager 718 is the encoded address manager 110 implemented in the server device 106 and/or the encoded address manager 116 implemented in the mobile device 102, such as a software application and/or as hardware components in the wireless device. In implementations, the encoded address manager 718 may include independent processing, memory, and logic components as a computing and/or electronic device integrated with the example device 700.

The example device 700 can also include a microphone 720 and/or camera devices 722, as well as proximity and/or motion sensors 724, such as may be implemented as components of an inertial measurement unit (IMU). The proximity and/or motion sensors 724 can be implemented with various sensors, such as a gyroscope, an accelerometer, and/or other types of motion sensors to sense motion of the device. The motion sensors 724 can generate sensor data vectors having three-dimensional parameters (e.g., rotational vectors in x, y, and z-axis coordinates) indicating location, position, acceleration, rotational speed, and/or orientation of the device. The example device 700 can also include one or more power sources 726, such as when the device is implemented as a wireless device, a server device (e.g., a server device 106), and/or a mobile device 102. The power sources may include a charging and/or power system, and can be implemented as a flexible strip battery, a rechargeable battery, a charged super-capacitor, and/or any other type of active or passive power source.

The example device 700 can also include an audio and/or video processing system 728 that generates audio data for an audio system 730 and/or generates display data for a display system 732. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 700. Alternatively, the audio system and/or the display system are external, peripheral components to the example device.

Although implementations of encoded package address for delivery have been described in language specific to features and/or methods, the appended claims are not necessarily limited to the specific features or methods described. Rather, the specific features and methods are disclosed as example implementations of encoded package address for delivery, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a server device, including: at least one processor coupled with a memory, and an encoded address manager implemented at least partially in hardware and configured to cause the server device to: generate an interactive encoded address for display on a package for delivery, the interactive encoded address corresponding to an address of an intended recipient of the package, receive, via the interactive encoded address, a request to retrieve the address, and selectively transmit at least a portion of the address for display to an authorized user.

In some aspects, the techniques described herein relate to a server device, wherein: the request is received from the authorized user, and the at least one processor is configured to cause the server device to verify the authorized user on a list of user identifiers corresponding to one or more of authorized users or authorized mobile devices, and selectively transmit at least the portion of the address for display based on the authorized user being verified.

In some aspects, the techniques described herein relate to a server device, wherein the at least one processor is configured to cause the server device to retrieve, from a database, the address of the intended recipient of the package based on the request.

In some aspects, the techniques described herein relate to a server device, wherein the at least one processor is further configured to cause the server device to determine a level of access to the address corresponding to a user identifier associated with the authorized user, wherein at least the portion of the address is based on the level of access to the address.

In some aspects, the techniques described herein relate to a server device, wherein the at least one processor is further configured to cause the server device to: receive an additional request to retrieve the address via the interactive encoded address, and transmit, in response to the additional request, at least an additional portion of the address for display to an additional authorized user based on the list of user identifiers including a user identifier associated with the additional authorized user.

In some aspects, the techniques described herein relate to a server device, wherein the at least one processor is configured to cause the server device to deactivate the interactive encoded address preventing access to the address of the intended recipient of the package.

In some aspects, the techniques described herein relate to a server device, wherein the at least one processor is further configured to cause the server device to: receive, after the interactive encoded address is deactivated, an additional request to retrieve the address via the interactive encoded address, and transmit, in response to the additional request, an indication that the interactive encoded address is deactivated.

In some aspects, the techniques described herein relate to a server device, wherein the at least one processor is configured to cause the server device to refrain from transmitting at least the portion of the address to an unauthorized requestor based on a list of user identifiers failing to include a user identifier associated with the unauthorized requestor.

In some aspects, the techniques described herein relate to a server device, wherein the at least one processor is configured to cause the server device to transmit a message indicating that the list of user identifiers fails to include the user identifier associated with the unauthorized requestor.

In some aspects, the techniques described herein relate to a server device, wherein the interactive encoded address includes at least one of a quick response (QR) code or a barcode.

In some aspects, the techniques described herein relate to a mobile device, including: at least one processor coupled with a memory, and an encoded address manager implemented at least partially in hardware and configured to cause the mobile device to: transmit, based on a scan of an interactive encoded address displayed on a package for delivery, a request to retrieve an address of an intended recipient of the package, receive, in response to the request, at least a portion of the address, and display at least the portion of the address to an authorized user.

In some aspects, the techniques described herein relate to a mobile device, wherein: at least the portion of the address is received based on a list of user identifiers corresponding to one or more of authorized users or authorized mobile devices including a user identifier associated with the authorized user, and the request is transmitted from the authorized user.

In some aspects, the techniques described herein relate to a mobile device, wherein the interactive encoded address includes at least one of a quick response (QR) code or a barcode.

In some aspects, the techniques described herein relate to a method, including: generating an interactive encoded address for display on a package for delivery, the interactive encoded address corresponding to an address of an intended recipient of the package, receiving a request to retrieve the address via the interactive encoded address, and selectively transmitting at least a portion of the address for display to an authorized user.

In some aspects, the techniques described herein relate to a method, further including verifying the authorized user is on a list of user identifiers corresponding to one or more of authorized users or authorized mobile devices, and selectively transmit at least the portion of the address for display based on the authorized user being verified.

In some aspects, the techniques described herein relate to a method, further including deactivating the interactive encoded address based on the list of user identifiers including a user identifier associated with the authorized user.

In some aspects, the techniques described herein relate to a method, further including refraining from transmitting at least the portion of the address to an unauthorized requestor based on a list of user identifiers failing to include a user identifier associated with the unauthorized requestor.

In some aspects, the techniques described herein relate to a method, further including transmitting a message indicating that the list of user identifiers fails to include the user identifier associated with the unauthorized requestor.

In some aspects, the techniques described herein relate to a method, further including deactivating the interactive encoded address preventing access to the address of the intended recipient of the package.

In some aspects, the techniques described herein relate to a method, further including: receiving, after the interactive encoded address is deactivated, an additional request to retrieve the address via the interactive encoded address, and transmitting, in response to the additional request, an indication that the interactive encoded address is deactivated.

The invention claimed is:

1. A server device, comprising:

at least one processor coupled with a memory; and an encoded address manager implemented at least partially in hardware and configured to cause the server device to:

generate an interactive encoded address for display on a package for delivery, the interactive encoded address corresponding to an address of an intended recipient of the package;

receive, via the interactive encoded address, a request to retrieve the address, wherein the request indicates a user identifier associated with a user;

determine, based on comparing the user identifier to a list of user identifiers, a level of access of the user to the address;

selectively transmit, based on the level of access of the user to the address, at least a portion of the address for display to the user;

receive a message that triggers deactivation of the interactive encoded address based on a final user identifier in the list of user identifiers interacting with the interactive encoded address; and deactivate, based on the message, the interactive encoded address and access to the address of the intended recipient of the package.

2. The server device of claim 1, wherein the request is received from the user, and wherein to selectively transmit at least the portion of the address, the at least one processor is configured to cause the server device to:

verify that the user identifier is on the list of user identifiers, wherein the list of user identifiers corresponds to one or more of authorized users or authorized mobile devices; and transmit at least the portion of the address for display based on the user being verified.

3. The server device of claim 2, wherein the at least one processor is configured to cause the server device to retrieve, from a database, the address of the intended recipient of the package based on the request.

4. The server device of claim 2, wherein the at least one processor is further configured to cause the server device to:

receive an additional request to retrieve the address via the interactive encoded address; and transmit, in response to the additional request, at least an additional portion of the address for display to an additional user based on the list of user identifiers including an additional user identifier associated with the additional user.

5. The server device of claim 1, wherein the message includes at least one of the final user identifier or an indication that the delivery for the package is complete.

6. The server device of claim 1, wherein the at least one processor is further configured to cause the server device to:

receive, after the interactive encoded address is deactivated, an additional request to retrieve the address via the interactive encoded address; and transmit, in response to the additional request, an indication that the interactive encoded address is deactivated.

7. The server device of claim 1, wherein to selectively transmit at least the portion of the address, the at least one processor is configured to cause the server device to refrain from transmitting at least the portion of the address to the user based on the list of user identifiers failing to include the user identifier.

8. The server device of claim 7, wherein the at least one processor is configured to cause the server device to transmit an additional message indicating that the list of user identifiers fails to include the user identifier.

9. The server device of claim 1, wherein the interactive encoded address includes at least one of a quick response (QR) code or a barcode.

10. A mobile device, comprising:

at least one processor coupled with a memory; and an encoded address manager implemented at least partially in hardware and configured to cause the mobile device to:

transmit, based on a scan of an interactive encoded address displayed on a package for delivery, a request to retrieve an address of an intended recipient of the package, wherein the request indicates a user identifier associated with a user;

receive, in response to the request and based on a level of access of the user to the address, at least a portion of the address, wherein the level of access of the user is based on a list of user identifiers;

display at least the portion of the address to the user; and transmit a message that triggers deactivation of the interactive encoded address based on a final user identifier in the list of user identifiers interacting with the interactive encoded address, wherein the interactive encoded address and access to the address is deactivated based on the message.

11. The mobile device of claim 10, wherein:

at least the portion of the address is received based on the list of user identifiers including the user identifier;

the list of user identifiers corresponds to one or more of authorized users or authorized mobile devices; and the request is transmitted from the user.

12. The mobile device of claim 10, wherein the interactive encoded address includes at least one of a quick response (QR) code or a barcode.

13. A method, comprising:

generating an interactive encoded address for display on a package for delivery, the interactive encoded address corresponding to an address of an intended recipient of the package;

receiving a request to retrieve the address via the interactive encoded address, wherein the request indicates a user identifier associated with a user;

determining, based on comparing the user identifier to a list of user identifiers, a level of access of the user to the address;

selectively transmitting, based on the level of access of the user to the address, at least a portion of the address for display to the user;

receiving a message that triggers deactivation of the interactive encoded address based on a final user identifier in the list of user identifiers interacting with the interactive encoded address; and deactivating, based on the message, the interactive encoded address and access to the address of the intended recipient of the package.

14. The method of claim 13, wherein selectively transmitting at least the portion of the address comprises:

verifying that the user identifier is on the list of user identifiers, wherein the list of user identifiers corresponds to one or more of authorized users or authorized mobile devices; and transmitting at least the portion of the address for display based on the user being verified.

15. The method of claim 14, wherein deactivating the interactive encoded address is based on the list of user identifiers including the user identifier.

16. The method of claim 13, wherein selectively transmitting at least the portion of the address comprises refraining from transmitting at least the portion of the address to the user based on the list of user identifiers failing to include the user identifier.

17. The method of claim 16, further comprising transmitting an additional message indicating that the list of user identifiers fails to include the user identifier.

18. The method of claim 13, wherein the message includes at least one of the final user identifier or an indication that the delivery for the package is complete.

19. The method of claim 13, further comprising:

receiving, after the interactive encoded address is deactivated, an additional request to retrieve the address via the interactive encoded address; and transmitting, in response to the additional request, an indication that the interactive encoded address is deactivated.

20. The server device of claim 1, wherein to determine the level of access of the user to the address, the at least one processor is configured to cause the server device to receive input that indicates a plurality of user identifiers on the list of user identifiers and that indicates respective levels of access to the address corresponding to the plurality of user identifiers.

* * * * *